United States Patent
Kobayashi et al.

(10) Patent No.: US 9,401,235 B2
(45) Date of Patent: *Jul. 26, 2016

(54) SINTERED FERRITE MAGNET AND ITS PRODUCTION METHOD

(75) Inventors: Yoshinori Kobayashi, Mishima-gun (JP); Tsunehiro Kawata, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 248 days.

This patent is subject to a terminal disclaimer.

(21) Appl. No.: 13/976,841

(22) PCT Filed: Dec. 26, 2011

(86) PCT No.: PCT/JP2011/080069
§ 371 (c)(1),
(2), (4) Date: Jun. 27, 2013

(87) PCT Pub. No.: WO2012/090935
PCT Pub. Date: Jul. 5, 2012

(65) Prior Publication Data
US 2013/0285779 A1 Oct. 31, 2013

(30) Foreign Application Priority Data
Dec. 28, 2010 (JP) .................... 2010-293598

(51) Int. Cl.
*H01F 1/10* (2006.01)
*H01F 1/11* (2006.01)
(Continued)

(52) U.S. Cl.
CPC .......... *H01F 1/0315* (2013.01); *C01G 49/0054* (2013.01); *C01G 51/68* (2013.01);
(Continued)

(58) Field of Classification Search
CPC ..................... C04B 35/2633; C04B 2235/767; C04B 2235/3227; C04B 2235/3208; C04B 2235/3213; C04B 2235/3418; C04B 2235/3275; C04B 2235/3215; C04B 2235/3274; C04B 2235/85; C04B 2235/80; C04B 35/2641; C04B 35/6262; C04B 35/62645; H01F 1/10; H01F 1/11; H01F 1/0315; H01F 1/342; H01F 1/344; C01G 49/0054; C01G 9/0036; C01G 51/68
USPC .......... 252/62.63, 62.57, 62.62, 62.59, 62.58, 252/62.56; 264/611; 335/302
See application file for complete search history.

(56) References Cited

U.S. PATENT DOCUMENTS 6,139,766 A * 10/2000 Taguchi .............. C04B 35/2641
252/62.57
6,402,980 B1 6/2002 Taguchi et al.
(Continued)

FOREIGN PATENT DOCUMENTS

CN 101552069 A 10/2009
JP 10-149910 A 6/1998
(Continued)

OTHER PUBLICATIONS

International Search Report for PCT/JP2011/080069 dated Apr. 3, 2012.
(Continued)

*Primary Examiner* — Matthew E Hoban
*Assistant Examiner* — Lynne Edmondson
(74) *Attorney, Agent, or Firm* — Sughrue Mion, PLLC

(57) ABSTRACT

A sintered ferrite magnet having a main phase composed of ferrite having a hexagonal, M-type magnetoplumbite structure, a grain boundary phase containing Si and Ca with a lower atomic ratio of La than in said main phase, and a third phase containing La at a higher atomic ratio than in said main phase, and a method for producing a sintered ferrite magnet having said third phase by calcining starting materials with more La than Ca, adding more than 1% and 1.8% or less by mass of $SiO_2$ and 1-2% by mass (calculated as CaO) of $CaCO_3$ to the calcined body, and pulverizing, molding and sintering it.

3 Claims, 10 Drawing Sheets

0.5 μm

(51) Int. Cl.
   *C04B 35/26* (2006.01)
   *H01F 1/03* (2006.01)
   *C01G 49/00* (2006.01)
   *C01G 51/00* (2006.01)
   *C04B 35/626* (2006.01)

(52) U.S. Cl.
   CPC ......... *C04B35/2633* (2013.01); *C04B 35/6262* (2013.01); *C04B 35/62645* (2013.01); *C04B 35/62685* (2013.01); *H01F 1/10* (2013.01); *C01P 2004/61* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3275* (2013.01); *C04B 2235/3409* (2013.01); *C04B 2235/3418* (2013.01); *C04B 2235/5436* (2013.01); *C04B 2235/6584* (2013.01); *C04B 2235/6585* (2013.01); *C04B 2235/767* (2013.01); *C04B 2235/80* (2013.01); *C04B 2235/85* (2013.01)

(56) References Cited

U.S. PATENT DOCUMENTS

| | | |
|---|---|---|
| 7,758,767 B2 | 7/2010 | Kobayashi et al. |
| 7,837,893 B2 | 11/2010 | Takami et al. |
| 7,919,007 B2 | 4/2011 | Minachi et al. |
| 8,021,567 B2 | 9/2011 | Takami et al. |
| 8,206,606 B2 | 6/2012 | Hosokawa et al. |
| 8,506,838 B2 * | 8/2013 | Hosokawa et al. ........ 252/62.63 |
| 2007/0138432 A1 | 6/2007 | Minachi et al. |
| 2007/0194269 A1 | 8/2007 | Kobayashi et al. |
| 2009/0022992 A1 * | 1/2009 | Takami ................ C04B 35/2633 428/402 |
| 2009/0261288 A1 | 10/2009 | Hosokawa et al. |
| 2010/0237273 A1 | 9/2010 | Kobayashi et al. |
| 2011/0024672 A1 | 2/2011 | Takami et al. |
| 2012/0326074 A1 | 12/2012 | Hosokawa et al. |
| 2013/0285779 A1 * | 10/2013 | Kobayashi ......... C01G 49/0054 335/302 |

FOREIGN PATENT DOCUMENTS

| | | | |
|---|---|---|---|
| JP | 11-154604 A | 6/1999 | |
| JP | 2001-068319 A | 3/2001 | |
| JP | 3181559 B2 | 7/2001 | |
| JP | 2003-151811 A | 5/2003 | |
| JP | 2006-104050 A | 4/2006 | |
| JP | 2006-117515 A | 5/2006 | |
| JP | WO 2007060757 A1 * | 5/2007 | .......... C04B 35/2633 |
| JP | 2008-137879 A | 6/2008 | |
| WO | 2007/060757 A1 | 5/2007 | |
| WO | WO 2007060757 A1 * | 5/2007 | |
| WO | 2007/077811 A1 | 7/2007 | |
| WO | 2011/111756 A1 | 9/2011 | |

OTHER PUBLICATIONS

Communication dated Apr. 24, 2015, issued by the State Intellectual Property Office of the People's Republic of China in counterpart Application No. 201180063132.3.

* cited by examiner

10 μm

10 μm

10 μm

10 μm

10 μm

10 μm

10 μm

10 μm

10 μm

10 μm

10 μm

10 μm

SINTERED FERRITE MAGNET AND ITS PRODUCTION METHOD

This is a National Stage Entry of Application No. PCT/JP2011/080069 filed Dec. 26, 2011 (claiming priority based on Japanese Patent Application No. 2010-293598 filed Dec. 28, 2010), the contents of which are incorporated herein by reference in their entirety.

FIELD OF THE INVENTION

The present invention relates to a sintered ferrite magnet and its production method.

BACKGROUND OF THE INVENTION

Sintered ferrite magnets are used in various applications such as motors, power generators, speakers, etc. Known as typical sintered ferrite magnets are Sr ferrite ($SrFe_{12}O_{19}$) and Ba ferrite ($BaFe_{12}O_{19}$) each having a hexagonal M-type magnetoplumbite structure. These sintered ferrite magnets are produced from starting materials comprising iron oxide, carbonates of strontium (Sr) or barium (Ba), etc. by a powder metallurgy method at a relatively low cost.

Recently, to provide smaller, lighter-weight, higher-performance electronic parts for automobiles, electric appliances, etc. for environmental advantages, sintered ferrite magnets are required to have higher performance. Particularly desired for motors for automobiles are sintered ferrite magnets having, in addition to high residual magnetic flux density $B_r$, such high coercivity $H_{cJ}$ as to avoid demagnetization when thinned.

JP 10-149910 A and JP 11-154604 A propose sintered Sr ferrite magnets having improved $H_{cJ}$ and $B_r$, in which part of Sr is substituted by a rare earth element such as La, etc., and part of Fe is substituted by Co.

Because the Sr ferrite described in JP 10-149910 A and JP 11-154604 A comprising Sr partially substituted by a rare earth element such as La, etc., and Fe partially substituted by Co, etc., which is hereinafter referred to as "Sr—La—Co ferrite," has excellent magnetic properties, it has been getting used for various applications in place of conventional Sr ferrite and Ba ferrite, but further improvement in magnetic properties is desired.

In addition to the above Sr ferrite and Ba ferrite, Ca ferrite is also known for sintered ferrite magnets. It is known that Ca ferrite having a composition represented by the formula of $CaO—Fe_2O_3$ or $CaO-2Fe_2O_3$ has a stable structure, constituting hexagonal ferrite by the addition of La. However, it has magnetic properties on substantially the same levels as those of conventional Ba ferrite, not sufficiently high.

To improve the $B_r$ and $H_{cJ}$ of Ca ferrite as well as the temperature characteristics of $H_{cJ}$, Japanese Patent 3181559 discloses Ca ferrite with part of Ca substituted by a rare earth element such as La, etc. and part of Fe substituted by Co, etc. (hereinafter referred to as "Ca—La—Co ferrite"), which has an anisotropic magnetic field $H_A$ of 20 kOe or more, higher by 10% or more than that of Sr ferrite.

However, the Ca—La—Co ferrite has substantially the same $B_r$ and $H_{cJ}$ as those of Sr—La—Co ferrite, despite a higher anisotropic magnetic field $H_A$ than that of the Sr—La—Co ferrite. In addition, having an extremely poor squareness ratio, it does not meet high coercivity and a high squareness ratio simultaneously, failing to be used for various applications such as motors, etc.

To improve the magnetic properties of the Ca—La—Co ferrite, various proposals have been made. For example, JP 2006-104050 A proposes Ca—La—Co ferrite having optimized composition ratio and molar ratio (n) of each element with a particular ratio of La to Co, WO 2007/060757 proposes Ca—La—Co ferrite with part of Ca substituted by La and Ba, and WO 2007/077811 proposes Ca—La—Co ferrite with part of Ca substituted by La and Sr.

Although any Ca—La—Co ferrites of JP 2006-104050 A, WO 2007/060757 and WO 2007/077811 have higher magnetic properties than those of the Ca—La—Co ferrite proposed by Japanese Patent 3181559, demand for higher performance is increasingly stronger recently, requiring further improvement in magnetic properties.

In sintered ferrite magnets, the addition of $SiO_2$, $CaCO_3$, etc. as sintering aids is known to change balance between $B_r$ and $H_{cJ}$, which are in a trade-off relation. To obtain high $B_r$, it is effective to reduce the amounts of sintering aids acting as non-magnetic components in a range having liquid phase components necessary for sintering, or to increase the amount of $CaCO_3$ relative to that of $SiO_2$. However, such measures make it difficult to maintain fine sintered structures, resulting in low $H_{cJ}$. On the other hand, to obtain high $H_{cJ}$, it is effective to increase the amounts of sintering aids, or to increase the amount of $SiO_2$ relative to that of $CaCO_3$. However, such measures increase the amounts of non-magnetic components or lower sinterability, inevitably resulting in decrease in $B_r$, and a squareness ratio $H_k/H_{cJ}$, wherein $H_k$ is the value of H at J of $0.95B_r$ on a curve of J (intensity of magnetization) to H (intensity of a magnetic field) in the second quadrant.

In conventional sintered ferrite magnets, particularly in Sr—La—Co ferrite and Ca—La—Co ferrite proposed recently, the amounts of sintering aids such as $SiO_2$, $CaCO_3$, etc. are generally as small as possible to maintain high $B_r$. For example, JP 2006-104050 A describes that 0.3-1.5% by mass (calculated as CaO) of $CaCO_3$ and 0.2-1.0% by mass of $SiO_2$ are added preferably at the time of pulverizing a calcined body, and WO 2007/060757 describes that 0.2-1.5% by mass (0.112-0.84% by mass when calculated as CaO) of $CaCO_3$, and 0.1-1.5% by mass of $SiO_2$ are added preferably at the time of pulverizing a calcined body.

However, JP 2006-104050 A and WO 2007/060757 describe in Examples only Ca—La—Co ferrite magnets, in which the amounts of $SiO_2$ and $CaCO_3$ (calculated as CaO) are respectively 0.9% or less by mass. Because emphasis is placed on the improvement of the $B_r$ of these ferrite magnets, the addition of $SiO_2$ and $CaCO_3$ in amounts of more than 0.9% by mass is not contemplated, providing no information about the magnetic properties ($B_r$, $H_{cJ}$ and $H_k/H_{cJ}$) of such Ca—La—Co ferrite magnets.

OBJECT OF THE INVENTION

Accordingly, an object of the present invention is to provide a sintered Ca—La—Co ferrite magnet having improved $H_{cJ}$ and $H_k/H_{cJ}$ while maintaining high $B_r$, which can therefore be made thinner, and its production method.

DISCLOSURE OF THE INVENTION

As a result of intensive research in view of the above object, the inventors have paid attention to sintering aids added in a pulverization step, finding that the addition of more than 1% by mass of $SiO_2$ as a sintering aid to Ca—La—Co ferrite specifically improves $H_{cJ}$, and that the addition of 1% or more by mass of $CaCO_3$ depending on the amount of $SiO_2$ added prevents decrease in $B_r$ and $H_k/H_{cJ}$ as much as possible.

As a result of further research concerning the relation between the compositions and structures of sintered Ca—La—Co ferrite magnets, the inventors have found that starting materials containing more La than Ca are calcined, mixed with SiO$_2$ and CaCO$_3$, pulverized, molded and sintered to produce a sintered magnet having a Ca—La—Co ferrite phase (ferrite having a hexagonal, M-type magnetoplumbite structure phase) as a main phase, a grain boundary phase (second phase) containing Si and Ca with a lower atomic ratio of La than in said main phase, and a third phase containing La at a higher atomic ratio than in said main phase. The inventors have also found that the existence of this third phase provides the sintered magnet with drastically improved $H_k/H_{cJ}$. The present invention has been completed based on such findings.

The addition of more than 1% by mass of SiO$_2$ peculiarly improves $H_{cJ}$ of Ca—La—Co ferrites, while the addition of SiO$_2$ and CaCO$_3$ in amounts of more than 1% by mass to the Sr—La—Co ferrites described in JP 10-149910 A and JP 11-154604 A drastically reduces $B_r$ and $H_k/H_{cJ}$ with slight improvement in $H_{cJ}$.

Measurement by a singular point detection (SPD) method has revealed that Ca—La—Co ferrite having a composition of Ca$_{1-x}$La$_x$Fe$_{2n-y}$Co$_y$, wherein an atomic ratio (y) of Co is 0.3, has an anisotropic magnetic field $H_A$ of 2.1 MA/m (about 26.4 kOe), higher than 1.8 MA/m (about 22.6 kOe) of usual Sr—La—Co ferrite having a composition of Sr$_{1-x}$La$_x$Fe$_{2n-y}$Co$_y$, wherein an atomic ratio (y) of Co is 0.2. Namely, higher $H_{cJ}$ is expected in Ca—La—Co ferrite than in Sr—La—Co ferrite. The details of the SPD method is described in Asti and S. Rinaldi, J. Appl. Phys., 45 (1974), pp. 3600-3610.

However, the Ca—La—Co ferrite magnets described in Examples of JP 2006-104050 A and WO 2007/060757, wherein the atomic ratio of Co is 0.3, have $H_{cJ}$ of about 400 kA/m (about 5 kOe) at highest. $H_{cJ}$ of about 400 kA/m is obtained even in Sr—La—Co ferrite, wherein the atomic ratio of Co is 0.2. Namely, Ca—La—Co ferrite magnets described in Examples of JP 2006-104050 A and WO 2007/060757 have $H_{cJ}$ substantially on the same level as that of Sr—La—Co ferrites, despite higher anisotropic magnetic fields $H_A$ than those of Sr—La—Co ferrites, indicating that $H_{cJ}$ does not reach the expected level, failing to exhibit an inherent potential. The specific improvement of $H_{cJ}$ by the addition of more than 1% by mass of SiO$_2$ in the present invention is an epoch-making phenomenon peculiar to Ca—La—Co ferrites, which nears the inherent potential of materials.

With respect to the third phase containing La at a higher atomic ratio than in the main phase, for example, JP 11-154604 A describes that with a large percentage of an element R (La is indispensable), undesired non-magnetic phases such as orthoferrite, etc. containing the element R are more formed, resulting in lower saturation magnetization (paragraphs [0034] and [0038], suggesting the existence of La-containing orthoferrite.

As described not only in JP 11-154604 A but also in many prior art references, because orthoferrite is an undesired phase lowering magnetic properties, it has been considered unnecessary in the magnets. Thus, suppressing the formation of orthoferrite as much as possible has been a technical common sense among those skilled in the art. The effect of the present invention that the existence of a third phase containing La at a higher atomic ratio than in said main phase provides the sintered magnet with drastically improved $H_k/H_{cJ}$ has overthrown the technical common sense among those skilled in the art.

Thus, the sintered ferrite magnet of the present invention has a main phase composed of ferrite having a hexagonal, M-type magnetoplumbite structure, a grain boundary phase containing Si and Ca with a lower atomic ratio of La than in said main phase, and a third phase containing La at a higher atomic ratio than in said main phase.

The amount of said third phase is preferably 0.5-5% by volume.

The amount of said third phase is preferably 1-3% by volume.

Said third phase preferably contains La, Ca, Si and Fe in such proportions that La is 8-50 atomic %, Ca is 20-45 atomic %, Si is 20-45 atomic %, and Fe is 4-20 atomic %, based on the total amount (100 atomic %) of said elements.

Said sintered ferrite magnet preferably comprises Ca, La, an element A (Ba and/or Sr), Fe and Co, the composition (by atomic ratio) of said metal elements being represented by the general formula of Ca$_{1-x-y}$La$_x$A$_y$Fe$_{2n-z}$Co$_z$, wherein 1−x−y, x, y and z, and n representing a molar ratio are numbers meeting $0.3 \leq 1-x-y \leq 0.75$, $0.2 \leq x \leq 0.65$, $0 \leq y \leq 0.2$, $0.25 \leq z \leq 0.65$, and $3 \leq n \leq 6$, said sintered ferrite magnet further containing more than 1% and 1.8% or less by mass of SiO$_2$.

The method of the present invention for producing a sintered ferrite magnet comprising Ca, La, an element A (Ba and/or Sr), Fe and Co, and having a main phase composed of ferrite having a hexagonal, M-type magnetoplumbite structure, a grain boundary phase containing Si and Ca with a lower atomic ratio of La than in said main phase, and a third phase containing La at a higher atomic ratio than in said main phase, comprises a step of preparing a starting material powder having a metal element composition (by atomic ratio) represented by the general formula of Ca$_{1-x-y}$La$_x$A$_y$Fe$_{2n-z}$Co$_z$, wherein 1−x−y, x, y and z, and n representing a molar ratio meet $0.3 \leq 1-x-y < 0.65$, $0.3 < x \leq 0.65$, $1-x-y < x$, $0 \leq y \leq 0.2$, $0.25 \leq z \leq 0.65$, and $4.5 \leq n \leq 7$;

a step of calcining said starting material powder to obtain a calcined body;
a step of pulverizing said calcined body to powder;
a step of molding said powder to obtain a green body; and
a step of sintering said green body to obtain a sintered body;
more than 1% and 1.8% or less by mass of SiO$_2$ and 1-2% by mass (calculated as CaO) of CaCO$_3$ being added to 100% by mass of said calcined body before the pulverization step.

The amount of said SiO$_2$ added is preferably 1.1-1.6% by mass.

The amount of said $CaCO_3$ added is preferably 1.2-2% by mass (calculated as CaO).

DESCRIPTION OF THE PREFERRED EMBODIMENTS

[1] Sintered Ferrite Magnet

Figure 1A:
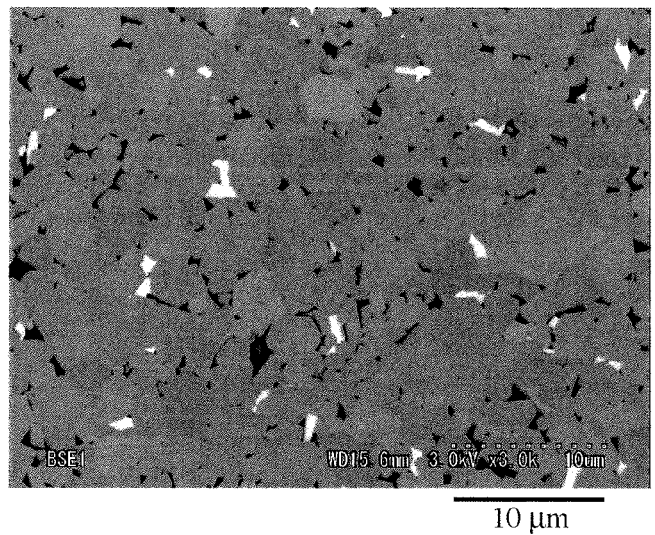
FIG. 1(A) is a photograph showing a backscattered electron image by FE-SEM of the cylindrical sintered ferrite magnet of Example 1 in a field in a plane (c-plane) perpendicular to its axial direction.
Figure 1B:
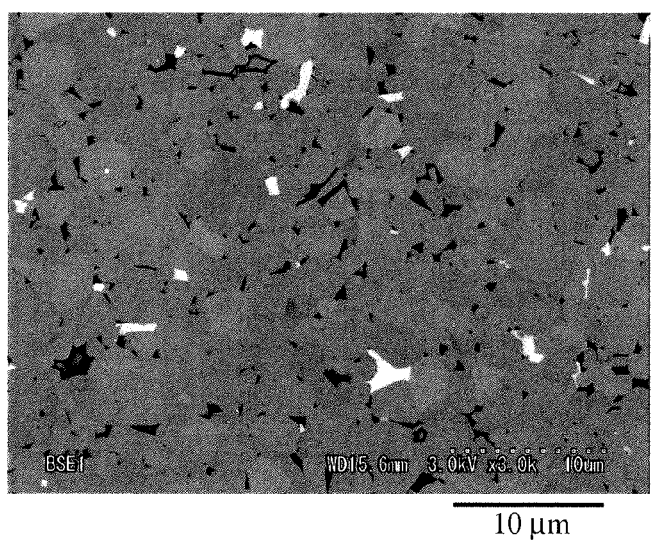
FIG. 1(B) is a photograph showing a backscattered electron image by FE-SEM of the cylindrical sintered ferrite magnet of Example 1 in another field in a plane (c-plane) perpendicular to its axial direction.
Figure 1C:
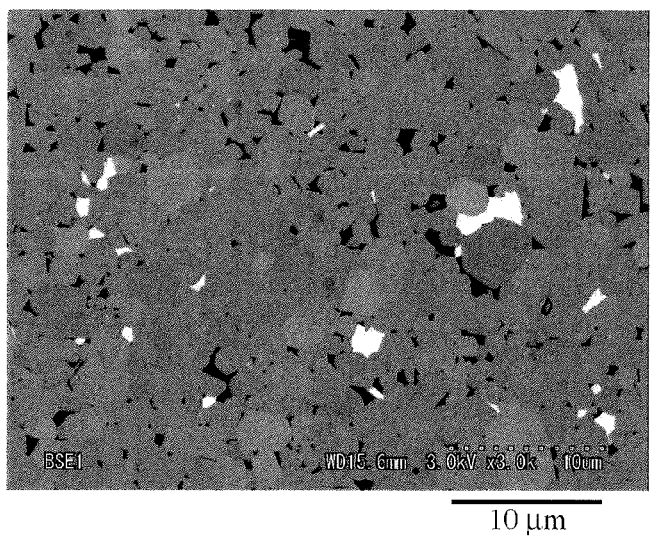
FIG. 1(C) is a photograph showing a backscattered electron image by FE-SEM of the cylindrical sintered ferrite magnet of Example 1 in a further field in a plane (c-plane) perpendicular to its axial direction.
Figure 1D:
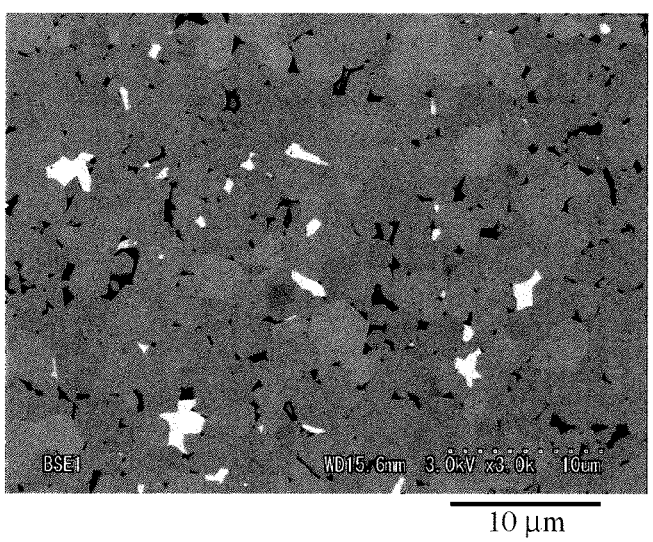
FIG. 1(D) is a photograph showing a backscattered electron image by FE-SEM of the cylindrical sintered ferrite magnet of Example 1 in a still further field in a plane (c-plane) perpendicular to its axial direction.
Figure 2A:
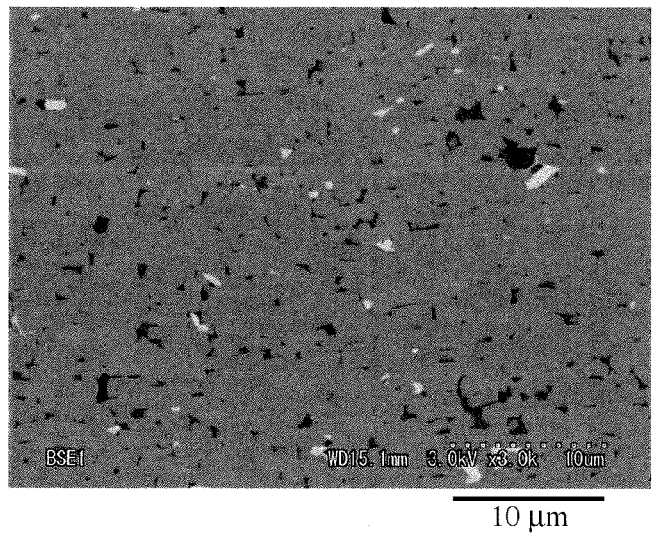
FIG. 2(A) is a photograph showing a backscattered electron image by FE-SEM of the cylindrical sintered ferrite magnet of Example 1 in a field in a plane (ab-plane) parallel to its axial direction.
Figure 2B:
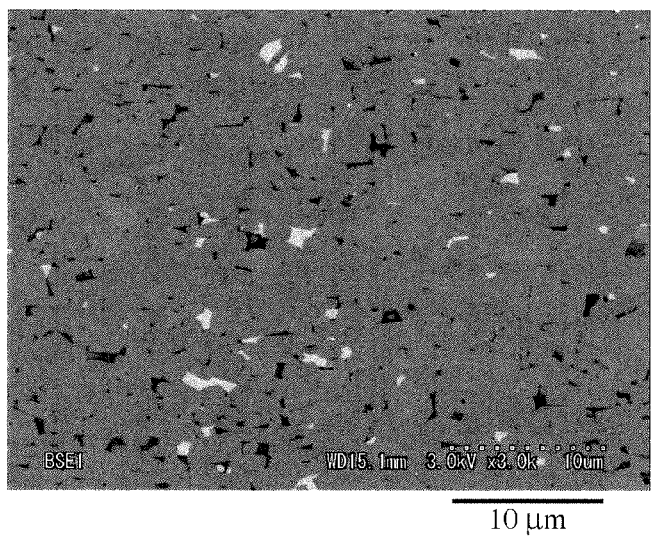
FIG. 2(B) is a photograph showing a backscattered electron image by FE-SEM of the cylindrical sintered ferrite magnet of Example 1 in another field in a plane (ab-plane) parallel to its axial direction.
Figure 2C:
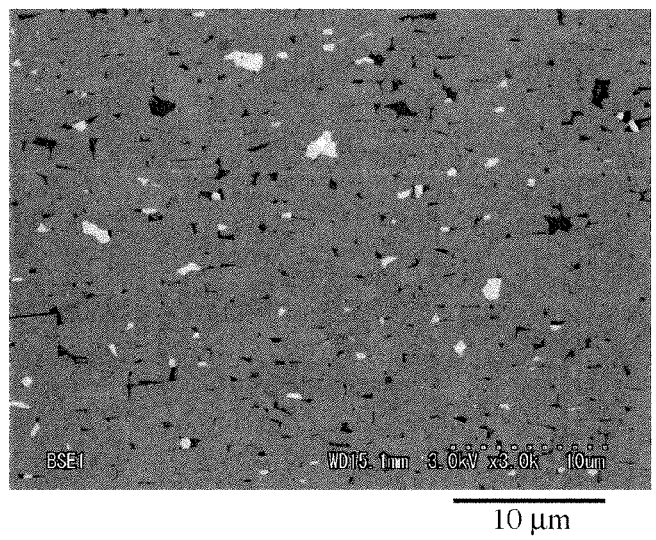
FIG. 2(C) is a photograph showing a backscattered electron image by FE-SEM of the cylindrical sintered ferrite magnet of Example 1 in a further field in a plane (ab-plane) parallel to its axial direction.
Figure 2D:
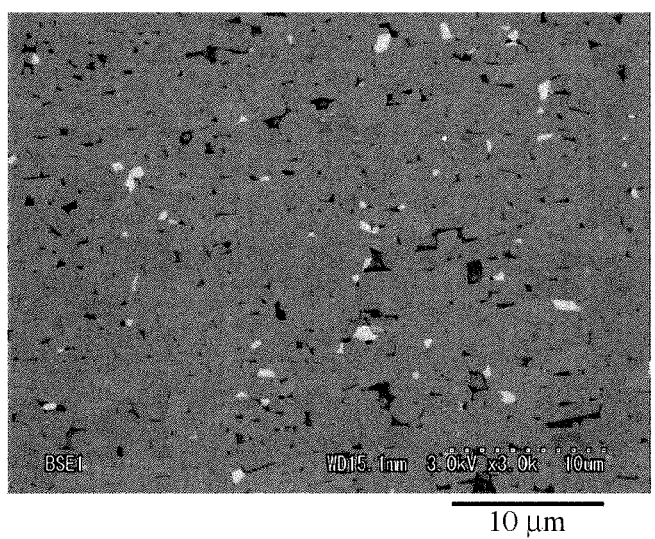
FIG. 2(D) is a photograph showing a backscattered electron image by FE-SEM of the cylindrical sintered ferrite magnet of Example 1 in a still further field in a plane (ab-plane) parallel to its axial direction.
Figure 3A:
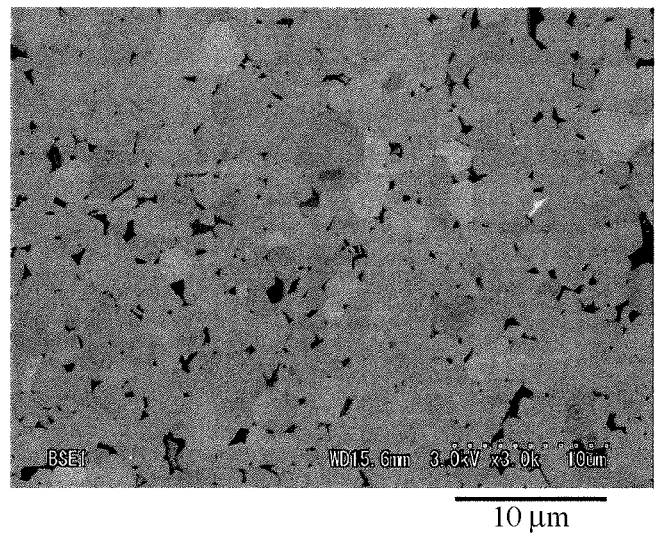
FIG. 3(A) is a photograph showing a backscattered electron image by FE-SEM of the cylindrical sintered ferrite magnet of Comparative Example 1 in a field in a plane (c-plane) perpendicular to its axial direction.
Figure 3B:
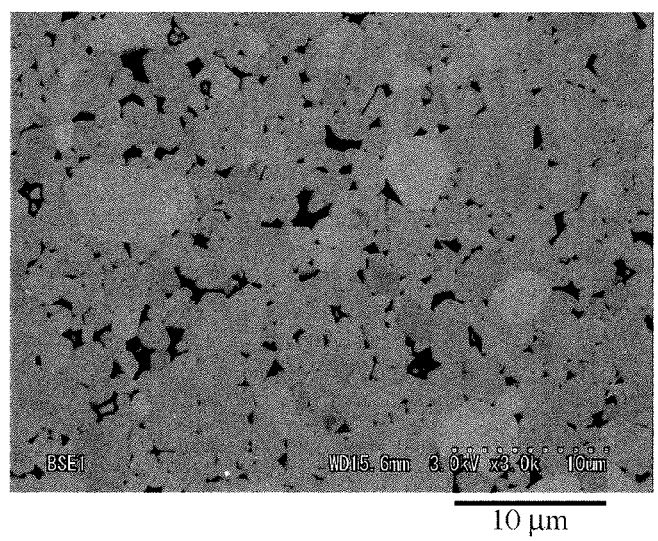
FIG. 3(B) is a photograph showing a backscattered electron image by FE-SEM of the cylindrical sintered ferrite magnet of Comparative Example 1 in another field in a plane (c-plane) perpendicular to its axial direction.
Figure 3C:
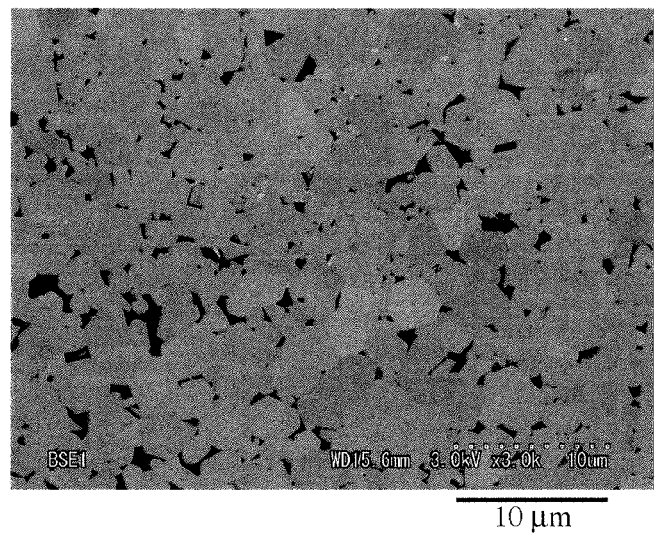
FIG. 3(C) is a photograph showing a backscattered electron image by FE-SEM of the cylindrical sintered ferrite magnet of Comparative Example 1 in a further field in a plane (c-plane) perpendicular to its axial direction.
Figure 3D:
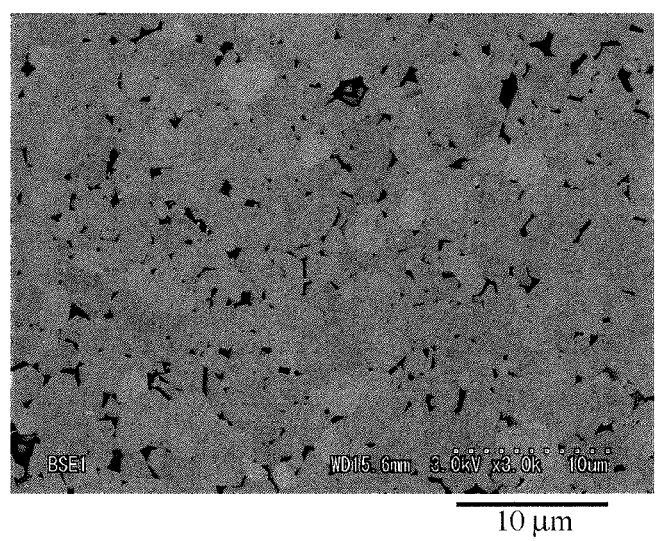
FIG. 3(D) is a photograph showing a backscattered electron image by FE-SEM of the cylindrical sintered ferrite magnet of Comparative Example 1 in a still further field in a plane (c-plane) perpendicular to its axial direction.
Figure 4A:
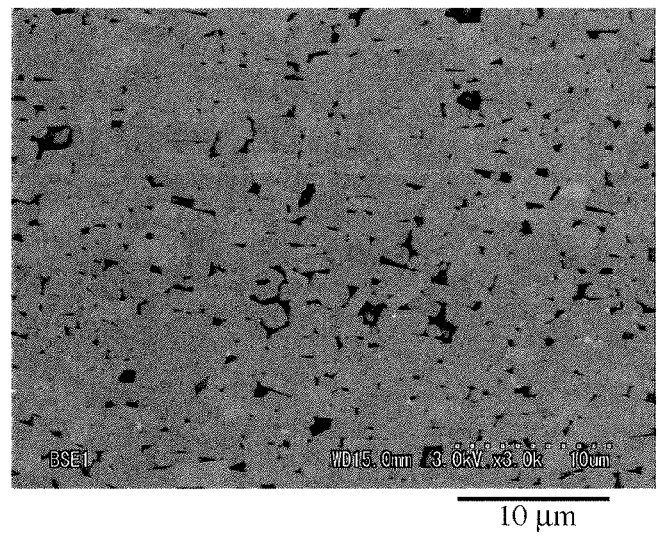
FIG. 4(A) is a photograph showing a backscattered electron image by FE-SEM of the cylindrical sintered ferrite magnet of Comparative Example 1 in a field in a plane (ab-plane) parallel to its axial direction.
Figure 4B:
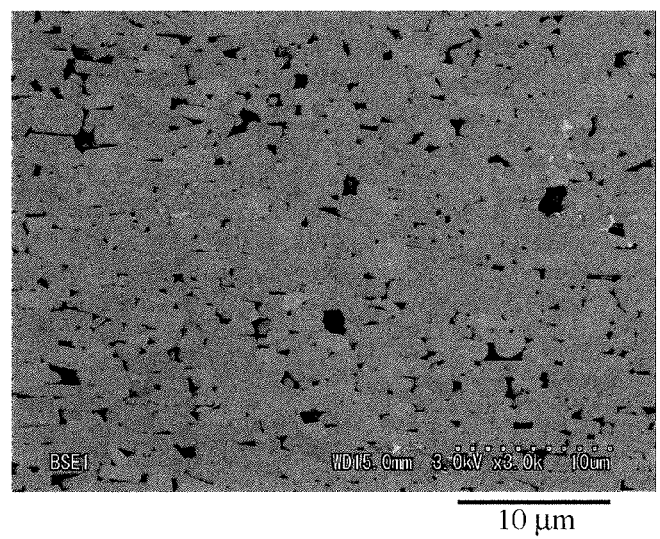
FIG. 4(B) is a photograph showing a backscattered electron image by FE-SEM of the cylindrical sintered ferrite magnet of Comparative Example 1 in another field in a plane (ab-plane) parallel to its axial direction.
Figure 4C:
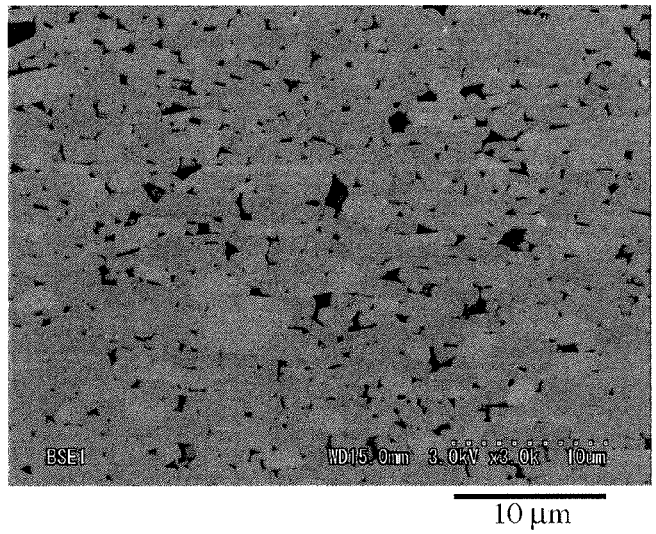
FIG. 4(C) is a photograph showing a backscattered electron image by FE-SEM of the cylindrical sintered ferrite magnet of Comparative Example 1 in a further field in a plane (ab-plane) parallel to its axial direction.
Figure 4D:
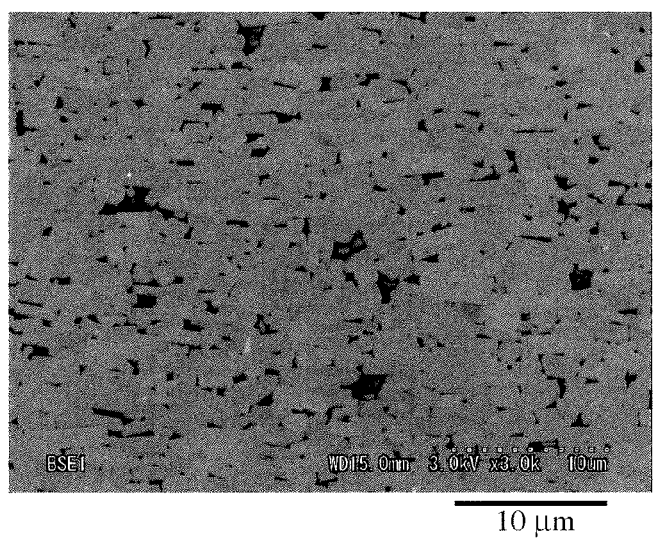
FIG. 4(D) is a photograph showing a backscattered electron image by FE-SEM of the cylindrical sintered ferrite magnet of Comparative Example 1 in a still further field in a plane (ab-plane) parallel to its axial direction.

The sintered ferrite magnet of the present invention has a main phase of ferrite having a hexagonal, M-type magnetoplumbite structure, a grain boundary phase containing Si and Ca with a lower atomic ratio of La than in said main phase, and a third phase containing La at a higher atomic ratio than in said main phase.

The main phase constituting the sintered ferrite magnet of the present invention is a ferrite phase having a hexagonal, M-type magnetoplumbite structure. In general, magnetic materials, particularly sintered magnets are composed of pluralities of compounds, and compounds determining their properties (physical properties, magnetic properties, etc.) are defined as "main phases." The main phase in the present invention, namely, a ferrite phase having a hexagonal, M-type magnetoplumbite structure, basically determines the physical properties, magnetic properties, etc. of the sintered ferrite magnet of the present invention.

The term "having a hexagonal, M-type magnetoplumbite structure" means that an X-ray diffraction pattern of a hexagonal, M-type magnetoplumbite structure is mainly observed in the X-ray diffraction measurement of a sintered ferrite magnet under general conditions.

The sintered ferrite magnet of the present invention has a grain boundary phase containing Si and Ca with a lower atomic ratio of La than in said main phase. In the present invention, more than 1% and 1.8% or less by mass of $SiO_2$ and 1-2% by mass (calculated as CaO) of $CaCO_3$ are added to 100% by mass of a calcined body in the production process of the sintered ferrite magnet, as described in Production Method below. Because these $SiO_2$ and $CaCO_3$ are main constituents of the grain boundary phase, the grain boundary phase indispensably contains Si and Ca. Said grain boundary phase is preferably observed by a transmission electron microscope, etc., because of difficulty in observation by an X-ray diffraction pattern.

The atomic ratio of La (among metal elements except for oxygen) is lower in the grain boundary phase than in the main phase. La is essentially not contained in the grain boundary phase, but when the sintered magnet contains a relatively large amount of La, La not permitted to exist in the main phase and the third phase may be contained in a small amount in the grain boundary phase. Incidentally, in observation by a transmission electron microscope, etc., La around the grain boundary phase or in the main phase or the third phase below the grain boundary phase may be detected.

The sintered ferrite magnet of the present invention contains a third phase containing La at a higher atomic ratio (among metal elements except for oxygen) than in said main phase. This is a main feature of the sintered ferrite magnet of the present invention. It should be understood that this phase is called "third phase," when said main phase is called a first phase, and said grain boundary phase is called a second phase, not defining their constituent ratios, the order of precipitation, etc.

As described above, recent prior art references such as JP 11-154604 A proposing Sr—La—Co ferrites and Ca—La—Co ferrites suggest the existence of orthoferrite. However, because the orthoferrite is an undesired phase deteriorating magnetic properties, it has been commonly recognized by those skilled in the art that the orthoferrite should not be contained as a constituent phase. On the contrary, the present invention has been achieved based on the discovery that a third phase indispensably containing La at a higher atomic ratio than in said main phase provides the sintered magnet with drastically improved $H_k/H_{cJ}$.

The orthoferrite is a compound represented by $RFeO_3$ containing a rare earth element (R) and Fe and having a perovskite structure. Said third phase is not constituted by orthoferrite alone, but may partially have orthoferrite.

Observation by energy dispersive x-ray spectrometry (EDS) by a field emission transmission electron microscope (FE-TEM) has revealed that said third phase contains La, Ca, Si and Fe, whose ratios are 8-50 atomic % of La, 20-45 atomic % of Ca, 20-45 atomic % of Si, and 4-20 atomic % of Fe, based on the total amount (100 atomic %) of these elements (La, Ca, Si and Fe).

Although said grain boundary phase and the third phase contain oxygen in addition to the above elements, the quantitative determination of light elements such as boron (B), carbon (C), nitrogen (N), oxygen (O), etc. by composition analysis by EDS is difficult. Accordingly, in the present invention, the composition is represented by atomic ratios of other elements than the light elements, whose amounts can be quantitatively determined by EDS.

As described in "Production method" below, the sintered ferrite magnet of the present invention is produced by calcining a starting material powder containing more La than Ca, and adding more than 1% and 1.8% or less by mass of $SiO_2$ and 1-2% by mass (calculated as CaO) of $CaCO_3$ to 100% by mass of said calcined body. The amounts of $SiO_2$ and $CaCO_3$ added are more than those added to general Sr—La—Co ferrites and Ca—La—Co ferrites. It is considered that the third phase containing particular amounts of La, Ca, Si and Fe is formed by such special method, and that the third phase provides the sintered magnet with improved $H_k/H_{cJ}$.

Though the orthoferrite phase is formed even in sintered magnets of conventionally known Sr—La—Co ferrites and Ca—La—Co ferrites, when a relatively large amount of La is contained, it is not considered that Si and Ca are contained in said orthoferrite phase, because the addition of $SiO_2$ and $CaCO_3$ in amounts exceeding 0.9% by mass has not been contemplated in these sintered magnets. Because an orthoferrite ($LaFeO_3$) phase containing only La and Fe without Si and Ca does not have an effect of improving $H_k/H_{cJ}$, it has merely been considered as an undesired phase deteriorating magnetic properties.

The sintered ferrite magnet of the present invention has improved $H_k/H_{cJ}$, when it contains 0.5-5% by volume of said third phase. Particularly when the volume ratio is 1-3%, the $H_k/H_{cJ}$ is remarkably improved. The volume ratio of the third phase is a value converted from an area ratio of a phase having a higher atomic ratio of La than in a main phase, the area ratio being obtained by the image treatment of a backscattered electron (BSE) image by a field emission scanning electron microscope (FE-SEM) of a sintered magnet cross section.

The sintered ferrite magnet of the present invention may contain, in addition to the main phase, the grain boundary phase and the third phase described above, trace amounts (about 5% or less by mass) of undesired phases (spinel phase, etc.) and impurity phases, which are observed by X-ray diffraction, etc. The quantitative determination of undesired phases by X-ray diffraction can be conducted by such a method as Rietveld analysis.

The sintered ferrite magnet of the present invention containing the main phase, the grain boundary phase and the third phase preferably has a composition described below. Outside the composition described below, at least one of $B_r$, $H_{cJ}$ and $H_k/H_{cJ}$ is low, failing to obtain a preferred sintered ferrite magnet. The reasons for limiting a composition range of each element will be explained in detail in the column of "Production method of sintered ferrite magnet" below.

The sintered ferrite magnet of the present invention contains Ca, La, an element A (Ba and/or Sr), Fe and Co, the composition ratios of these metal elements being represented by the general formula of $Ca_{1-x-y}La_xA_yFe_{2n-z}Co_z$ (atomic ratio), wherein 1−x−y, x, y and z, and n (molar ratio) are numbers meeting $0.3 \le 1-x-y \le 0.75$, $0.2 \le x \le 0.65$, $0 \le y \le 0.2$, $0.25 \le z \le 0.65$, and $3 \le n \le 6$, the amount of $SiO_2$ contained being more than 1% and 1.8% or less by mass.

[2] Production Method of Sintered Ferrite Magnet

A method for producing the sintered ferrite magnet of the present invention containing Ca, La, an element A (Ba and/or Sr), Fe and Co, and having a main phase, a grain boundary phase and a third phase, comprises the steps of preparing a starting material powder represented by the general formula of $Ca_{1-x-y}La_xA_yFe_{2n-z}Co_z$, wherein 1−x−y, x, y and z expressing the atomic ratios of said metal elements, and n expressing their molar ratio meet $0.3 \le 1-x-y < 0.65$, $0.3 < x \le 0.65$, $1-x-y < x$, $0 \le y \le 0.2$, $0.25 \le z \le 0.65$, and $4.5 \le n \le 7$;

calcining said starting material powder to form a calcined body;

pulverizing said calcined body to powder;

molding said powder to form a green body; and sintering said green body to form a sintered body;

more than 1% and 1.8% or less by mass of $SiO_2$ and 1-2% by mass (calculated as CaO) of $CaCO_3$ being added to 100% by mass of said calcined body before the pulverization step.

Each step will be explained below.

(a) Step of Preparing Starting Material Powder

The starting material powder is prepared by mixing a compound of Ca, a compound of La, compounds of Ba and/or Sr, a compound of Fe, and a compound of Co, such that the composition ratios of metal elements are represented by the general formula of $Ca_{1-x-y}La_xA_yFe_{2n-z}Co_z$ (atomic ratio), wherein 1−x−y, x, y and z, and n expressing a molar ratio are numbers meeting $$0.3 \le 1-x-y < 0.65,$$

$$0.3 < x \le 0.65,$$

$$1-x-y < x,$$

$$0 \le y \le 0.2,$$

$$0.25 \le z \le 0.65, \text{ and}$$

$$4.5 \le n \le 7.$$

The Ca content (1−x−y) in the starting material powder is $0.3 \le 1-x-y < 0.65$. Less than 0.3 of Ca undesirably provides low $B_r$ and $H_k/H_{cJ}$. 0.65 or more of Ca undesirably makes the Ca content larger than the La content (x), failing to form the third phase in the sintered ferrite magnet. The sintered ferrite magnet has an increased Ca content, because 1-2% by mass (calculated as CaO) of $CaCO_3$ is added to 100% by mass of the calcined body before the pulverization step. Thus, the Ca content (1−x−y) in the sintered ferrite magnet is $0.3 \le 1-x-y \le 0.75$.

The La content (x) in the starting material powder is $0.3 < x \le 0.65$. 0.3 or less of La undesirably makes the Ca content larger than the La content (x), failing to form the third phase in the sintered ferrite magnet. More than 0.65 of La undesirably provides too much La in the grain boundary phase or the third phase, resulting in low $B_r$. Part of La may be substituted by at least one rare earth element except for La. The amount of a substituting rare earth element is preferably 50% or less by mol of La. The sintered ferrite magnet has an increased Ca content and a decreased La content, because 1-2% by mass (calculated as CaO) of $CaCO_3$ is added to 100% by mass of the calcined body before the pulverization step. Thus, the La content (x) in the sintered ferrite magnet is $0.2 \le x \le 0.65$.

The Ca content (1−x−y) and the La content (x) in the starting material powder should meet the relation of 1−x−y<x, namely, the La content should be larger than the Ca content, to form the third phase in the sintered ferrite magnet, thereby improving $H_k/H_{cJ}$. This is the first feature of the production method of the present invention.

In conventionally known Ca—La—Co ferrites, it is proposed, for example, by JP 2006-104050 A to add more La than Co at a ratio (x/y) of La (x) to Co (y) of 1.4-2.5, but no consideration is made at all on the addition of more La than Ca, because it has been considered that the addition of more La than Ca forms orthoferrite, resulting in deteriorated magnetic properties.

The element A is Ba and/or Sr. The amount (y) of the element A in the starting material powder is $0 \le y \le 0.2$. Though the effects of the present invention would not be deteriorated if the element A were not contained, the addition of the element A makes crystals in the calcined body finer with smaller aspect ratios, resulting in further improved $H_{cJ}$. The percentage of the element A tends to be smaller in the sintered ferrite magnet by the addition of $CaCO_3$ before the pulverization step, but because of a small amount of the element A with its changeable range, the sintered ferrite magnet would have an unchanged amount of the element A.

The Co content (z) in the starting material powder is $0.25 \le z \le 0.65$. The addition of less than 0.25 of Co fails to improve magnetic properties. Because unreacted $\alpha$-$Fe_2O_3$ remains in the calcined body, a slurry leaks from a die cavity during wet molding. When Co exceeds 0.65, undesired phases containing a large amount of Co are formed, resulting in drastically decreased magnetic properties.

Part of Co may be substituted by at least one selected from the group consisting of Zn, Ni and Mn. Particularly, the partial substitution of Co with Ni and Mn decreases production cost without deteriorating magnetic properties. Also, the substitution of part of Co with Zn improves $B_r$, with slight decrease in $H_{cJ}$. The total amount of substituting Zn, Ni and Mn is preferably 50 mol % or less of Co.

n is a value representing a molar ratio of (Fe+Co) to (Ca+La+A), meeting 2n=(Fe+Co)/(Ca+La+A). The molar ratio n of the starting material powder is preferably $4.5 \le n \le 7$. When n is less than 4.5, there are a large percentage of non-magnetic portions, resulting in too flat calcined particles, and thus drastically decreased $H_{cJ}$. When n is more than 7, unreacted $\alpha$-$Fe_2O_3$ undesirably remains in the calcined body, resulting in slurry leak from a die cavity during wet molding. In the sintered ferrite magnet, the Ca content is increased by the addition of 1-2% by mass (calculated as CaO) of $CaCO_3$ to 100% by mass of the calcined body before the pulverization step, resulting in smaller n. Accordingly, the molar ratio n of the sintered ferrite magnet is $3 \le n \le 6$.

In the starting material powder, a molar ratio x/z of La to Co is preferably $1 \le x/z \le 3$, more preferably $1.2 \le x/z \le 2$. The selection of a composition meeting these relations provides improved magnetic properties.

When the amounts of La, Co and the element A meet the relation of La>Co>element A, namely x>z>y, in the starting material powder, the improved magnetic properties are obtained. Also, when the amounts of Ca and the element A meet the relation of Ca>element A, namely 1−x−y>y, in the starting material powder, the improved magnetic properties are obtained.

The above composition is expressed by the atomic ratios of metal elements, but the present invention is concerned with a sintered ferrite magnet, "ferrite" being a general name of a compound composed of divalent, cationic metal oxides and trivalent iron, meaning that the calcined body (ferrite) in the production method of the present invention indispensably contains oxygen (O). The composition of the calcined body containing oxygen (O) is represented by the following general formula of $Ca_{1-x-y}La_xA_yFe_{2n-z}Co_zO_\alpha$ (atomic ratio), wherein 1−x−y, x, y, z and $\alpha$, and n representing the molar ratio meet $$0.3 \le 1-x-y < 0.65,$$

$$0.3 < x \le 0.65,$$

$$1-x-y < x,$$

$$0 \le y \le 0.2,$$

$$0.25 \le z \le 0.65, \text{ and}$$

$$4.5 \le n \le 7,$$

La and Fe being trivalent, and Co being divalent, and $\alpha = 19$ at a stoichiometric composition ratio of x=y and n=6.

In the composition of the calcined ferrite containing oxygen (O), the molar ratio of oxygen changes depending on the valencies of Fe and Co, the value of n, etc. In the sintered ferrite magnet, the ratio of oxygen to metal elements also changes depending on the vacancy of oxygen when sintering is conducted in a reducing atmosphere, the vacancy change of Fe and Co in a ferrite phase, etc. Accordingly, the actual molar ratio $\alpha$ of oxygen may be different from 19. Thus, as the easiest way, the composition is expressed by the atomic ratios of metal elements in the present application.

In the starting material powder, metal compounds such as oxides, carbonates, hydroxides, nitrates, chlorides, etc. can be used without restriction regardless of their valences. The compounds may be not only in the form of powder but also in the form of a solution. For example, used as the Ca compound are carbonate, oxide, chloride, etc. of Ca. Used as the La compound are oxides such as $La_2O_3$, hydroxides such as $La(OH)_3$, carbonates such as $La_2(CO_3)_3 \cdot 8H_2O$, or their hydrates, etc. Used as the compound of the element A are carbonates, oxides, chlorides, etc. of Ba and/or Sr. Used as the Iron compound are iron oxide, iron hydroxide, iron chloride, mill scales, etc. Used as the Co compound are oxides such as CoO, $Co_3O_4$, $Co_2O_3$, etc., hydroxides such as CoOOH, $Co(OH)_2$, etc., carbonates such as $CoCO_3$, and $Co_3O_4 \cdot m_1H_2O$ ($m_1$ is a positive number), $m_2CoCO_3 \cdot m_3Co(OH)_2 \cdot m_4H_2O$, etc. ($m_2$, $m_3$, $m_4$ are positive numbers).

Starting material powders except for $CaCO_3$, $Fe_2O_3$ and $La_2O_3$ may be added when the starting materials are mixed, or after calcining. For example, (1) $CaCO_3$, $Fe_2O_3$, $La_2O_3$ and $Co_3O_4$ may be mixed and calcined, and the calcined body may be pulverized, molded and sintered to produce the sintered ferrite magnet, or (2) $CaCO_3$, $Fe_2O_3$ and $La_2O_3$ may be mixed and calcined, and the calcined body is mixed with $Co_3O_4$, pulverized, molded and sintered to produce a sintered ferrite magnet.

To accelerate a reaction during calcining, about 1% by mass of a B-containing compound such as $B_2O_3$, $H_3BO_3$, etc. may be added if necessary. Particularly, the addition of $H_3BO_3$ is effective to improve $H_{cJ}$ and $B_r$. The amount of $H_3BO_3$ added is more preferably 0.3% or less by mass, most preferably about 0.2% by mass, based on the total amount of starting material powders. Less than 0.1% by mass of $H_3BO_3$ provides little effect of improving $B_r$, while more than 0.3% by mass of $H_3BO_3$ reduces $B_r$. Because $H_3BO_3$ has effects of controlling the shapes and sizes of crystal grains during sintering, it may be added after calcining (before fine pulverization or sintering), or both before and after calcining.

The mixing of the starting material powders may be conducted in a wet or dry state. By stirring with media such as steel balls, the starting material powders can be mixed more uniformly. In the case of wet mixing, water is preferably used as a solvent. To improve the dispersion of starting material powders, known dispersants such as ammonium polycarboxylate, calcium gluconate, etc. may be used. A slurry of the mixed starting materials is dewatered to provide a starting material powder mixture.

(b) Calcining Step

The starting material powder mixture is heated in an electric furnace, a gas furnace, etc. to cause a solid phase reaction, thereby forming a ferrite compound having a hexagonal, M-type magnetoplumbite structure. This process is called "calcining," and the resultant compound is called "calcined body."

The calcining step is preferably conducted in an atmosphere having an oxygen concentration of 5% or more. The oxygen concentration of less than 5% provides abnormal grain growth, the formation of undesired phases, etc. The more preferred oxygen concentration is 20% or more.

In the calcining step, a solid phase reaction forming a ferrite phase proceeds as the temperature is elevated, and completes at about 1100° C. At a calcining temperature of lower than 1100° C., unreacted hematite (iron oxide) remains, resulting in low magnetic properties. On the other hand, at a calcining temperature higher than 1450° C., crystal grains grow excessively, too much time is likely needed in a pulverization step. Accordingly, the calcining temperature is preferably 1100-1450° C., more preferably 1200-1350° C. The calcining time is preferably 0.5-5 hours.

When $H_3BO_3$ is added before calcining, a ferritization reaction is accelerated, enabling calcining at 1100-1300° C.

(c) Addition of $SiO_2$ and $CaCO_3$

The production method of the present invention is characterized by adding more than 1% and 1.8% or less by mass of $SiO_2$ and 1-2% by mass (calculated as CaO) of $CaCO_3$ to 100% by mass of the calcined body before the pulverization step. This is the second feature in the production method of the present invention. This provides specifically improved $H_{cJ}$.

1% or less by mass of $SiO_2$ does not have an effect of improving $H_{cJ}$, and more than 1.8% by mass of $SiO_2$ undesirably reduces $H_{cJ}$, $B_r$, and $H_k/H_{cJ}$. The more preferred amount of $SiO_2$ added is 1.1-1.6% by mass. Though $SiO_2$ is most preferably added to the calcined body, part of it may be added before calcining (when the starting material powders are mixed). With $SiO_2$ added before calcining, the sizes of crystal grains can be controlled in the calcining.

1-2% by mass (calculated as CaO) of $CaCO_3$ is added to 100% by mass of the calcined body, depending on the amount of $SiO_2$ added. The addition of $CaCO_3$ prevents $B_r$ and $H_k/H_{cJ}$ from lowering, and its synergistic effect with the first feature that more La than Ca is added can provide a sintered ferrite magnet with high $H_{cJ}$ and high $H_k/H_{cJ}$ while keeping high $B_r$, which cannot be obtained conventionally. Less than 1% or more than 2% by mass (calculated as CaO) of $CaCO_3$ undesirably reduces $B_r$ and $H_k/H_{cJ}$. The more preferred amount of $CaCO_3$ added is 1.2-2% by mass.

With the amount of $CaCO_3$ (calculated as CaO) added per the amount of $SiO_2$ added restricted to 0.8-2, $SiO_2$ and $CaCO_3$ can further improve magnetic properties.

(d) Pulverization Step

The calcined body is pulverized by a vibration mill, a ball mill, an attritor, etc. The pulverized powder preferably has an average particle size (measured by an air permeation method) of about 0.4-0.8 μm. The pulverization step may be conducted by either dry pulverization or wet pulverization, though their combination is preferable.

The wet pulverization uses water and/or a non-aqueous solvent (organic solvents such as acetone, ethanol, xylene, etc.). The wet pulverization prepares a slurry of the calcined body in water (solvent). The slurry preferably contains known dispersant and/or surfactant at a solid ratio of 0.2-2% by mass. The wet-pulverized slurry is preferably concentrated and blended.

In the pulverization step, in addition to the above-described $SiO_2$ and $CaCO_3$, $Cr_2O_3$, $Al_2O_3$, etc. may be added to improve magnetic properties. The amount of each of them is preferably 5% or less by mass.

To remove ultrafine powder of less than 0.1 μm, which deteriorates dewaterability and moldability, from the pulverized powder, the pulverized powder is preferably heat-treated. The heat-treated powder is preferably pulverized again. With a pulverization step comprising a first fine pulverization step, a heat treatment of powder obtained by the first fine pulverization step, and a second fine pulverization step for re-pulverizing the heat-treated powder, which is called "heat-treating, re-pulverizing step," further improvement of $H_{cJ}$ can be achieved, in addition to improvement by the addition of $SiO_2$ and $CaCO_3$.

In a usual pulverization step, ultrafine powder of less than 0.1 μm is inevitably formed, and the ultrafine powder reduces $H_{cJ}$, deteriorates dewaterability in the molding step, provides green bodies with defects, and lowers the efficiency of pressing cycles because of too much time for dewatering. With a heat treatment conducted on powder containing ultrafine powder, which is obtained by the first fine pulverization step, a reaction occurs between relatively large powder and ultrafine powder, reducing the amount of the ultrafine powder. The control of particle sizes and the removal of necking are conducted by the second fine pulverization step, to form powder having predetermined particle sizes. Thus, powder with few ultrafine powder and an excellent particle size distribution can be obtained, thereby improving $H_{cJ}$, and solving the above problems in the molding step.

Improving $H_{cJ}$ by the heat-treating, re-pulverizing step, $H_{cJ}$ on the same level as that of powder having an average particle size of about 0.4-0.8 µm, which is prepared by a usual pulverization step, can be obtained even when the second fine pulverization step provides powder with relatively large particle sizes (for example, an average particle size of about 0.8-1.0 µm). Accordingly, the second fine pulverization step improves dewaterability and the efficiency of pressing cycles, resulting in a shorter process time.

Thus, the heat-treating, re-pulverizing step provides various advantages despite cost increase due to increase in production steps. However, because the improvement of magnetic properties achieved by the heat-treating, re-pulverizing step is much larger than when conventional sintered ferrite magnets are produced, the above cost increase can be offset. Accordingly, the heat-treating, re-pulverizing step is a practically significant step in the present invention.

The first fine pulverization uses a vibration mill, a jet mill, a ball mill, an attritor, etc., like the above-described usual pulverization. The pulverized powder preferably has an average particle size (measured by an air permeation method) of about 0.4-0.8 µm. The pulverization step may be dry pulverization or wet pulverization, though their combination is preferable.

The heat treatment after the first fine pulverization step is conducted preferably at 600-1200° C., more preferably at 800-1100° C. Though not restrictive, the heat treatment time is preferably 1 second to 100 hours, more preferably about 1-10 hours.

The second fine pulverization after the heat treatment step is conducted, as in the first fine pulverization, by a vibration mill, a jet mill, a ball mill, an attritor, etc. Because desired particle sizes are almost obtained by the first fine pulverization step, the second fine pulverization step mainly adjusts the particle size distribution and removes necking. Accordingly, its pulverization conditions are preferably lighter by a shorter pulverization time, etc. than in the first fine pulverization step. Pulverization under conditions on the same level as in the first fine pulverization step undesirably forms ultrafine powder again.

When higher $H_{cJ}$ than that of sintered ferrite magnets formed through a usual pulverization step is to be obtained, powder after the second fine pulverization preferably has an average particle size (measured by an air permeation method) of about 0.4-0.8 µm, as in the usual pulverization step. To shorten the pulverization time, or to improve dewaterability, press cycles, etc., the average particle size (measured by an air permeation method) of powder after the second fine pulverization is 0.8-1.2 µm, preferably about 0.8-1.0 µm.

(e) Molding Step

A slurry after pulverization is press-molded with or without a magnetic field, while removing water (solvent). Press-molding in a magnetic field can align crystal orientations in powder particles, thereby drastically improving magnetic properties. To further improve the orientation, a dispersant and a lubricant may be added in amounts of 0.01-1% by mass. Also, the slurry may be concentrated if necessary, before molding. Concentration is preferably conducted by centrifugal separation, filter pressing, etc.

(f) Sintering Step

A green body obtained by press-molding is sintered after optional degreasing. The sintering is conducted in an electric furnace, a gas furnace, etc. The sintering is preferably conducted in an atmosphere having an oxygen concentration of 10% or more. When the oxygen concentration is less than 10%, abnormal grain growth, the formation of undesired phases, etc. occur, resulting in deteriorated magnetic properties. The oxygen concentration is more preferably 20% or more, most preferably 100%. The sintering temperature is preferably 1150-1250° C. The sintering time is preferably 0.5-2 hours. The sintered magnet has an average crystal grain size of about 0.5-2 µm.

After the sintering step, a final sintered ferrite magnet is obtained through known steps such as a machining step, a washing step, an inspection step, etc.

The present invention will be explained in more detail referring to Examples, without intention of restricting the present invention thereto.

Example 1

$CaCO_3$ powder, $La(OH)_3$ powder, $Fe_2O_3$ powder and $Co_3O_4$ powder were mixed to have a composition of $Ca_{1-x-y}La_xA_yFe_{2n-z}Co_zO_\delta$, wherein x=0.55, y=0, z=0.3, n=5.2, and $\delta \geq 0$, and 0.1% by mass of $H_3BO_3$ powder was added to 100% by mass of the resultant mixed powder to obtain a starting material powder. This starting material powder was wet-ball-milled for 4 hours, dried, and granulated. The resultant granules were calcined at 1300° C. for 3 hours in the air, and the resultant calcined body was coarsely pulverized by a hammer mill to obtain coarse powder.

1.2% by mass of $SiO_2$ powder and 1.5% by mass (calculated as CaO) of $CaCO_3$ were added to 100% by mass of the coarse powder, and the resultant mixture was finely wet-pulverized to an average particle size (measured by an air permeation method) of 0.55 µm by a ball mill with water as a solvent. The resultant fine powder slurry was molded under pressure of about 50 MPa in a magnetic field of about 1.3 T in parallel to a pressing direction, while removing the solvent. The resultant green body was sintered at 1210° C. for 1 hour in the air to obtain a cylindrical sintered magnet, whose axial direction was in alignment with the magnetic field direction.

A La distribution in the cylindrical sintered magnet was measured by composition contrast observation in a backscattered electron (BSE) image obtained by a field emission scanning electron microscope (FE-SEM). The observation of La was conducted in a plane (c-plane) perpendicular to the axial direction of the cylindrical sintered magnet and in a plane (ab-plane) parallel to the axial direction. Four structure-showing photographs were arbitrarily taken in each plane. The results in the c-plane are shown in FIGS. 1(A) to 1(D), and those in the ab-plane are shown in FIGS. 2(A) to 2(D).

In FIGS. 1(A) to 1(D) and FIGS. 2(A) to 2(D), bright portions (white portions) show a phase having a higher atomic ratio of La than in the main phase, namely, the third phase in the present invention. It is clear from FIGS. 1(A) to 1(D) and FIGS. 2(A) to 2(D) that the third phase was dispersed in the sintered magnet.

Each structure-showing photograph was binarized to isolate the third phase from a background, thereby determining an area ratio of the third phase in a field observed as a volume ratio. The results are shown in Table 1. It is clear from Table 1 that the third phase was in a range of 1-3% by volume of the sintered magnet.

TABLE 1

|  |  | Volume Ratio (%) of Third Phase | | | |
|---|---|---|---|---|---|
| FIGS. | Observed Plane | (A) | (B) | (C) | (D) |
| FIG. 1 | c-Plane | 1.90 | 1.85 | 2.41 | 2.39 |
| FIG. 2 | ab-Plane | 1.37 | 1.87 | 2.14 | 1.60 |

Comparative Example 1

A cylindrical sintered magnet was produced in the same manner as in Example 1, except for formulating $CaCO_3$ powder, $La(OH)_3$ powder, $Fe_2O_3$ powder and $Co_3O_4$ powder to have a composition of $Ca_{1-x-y}La_xA_yFe_{2n-z}Co_zO_\delta$, wherein x=0.5, y=0, z=0.3, n=5.2, and δ≥0, namely, the Ca content (1−x−y) was equal to the La content (x). A La distribution in the cylindrical sintered magnet was measured in the same manner as in Example 1, using a field emission scanning electron microscope (FE-SEM). The results in a c-plane are shown in FIG. 3(A)-(D), and those in an ab-plane are shown in FIG. 4(A)-(D).

As is clear from FIGS. 3(A)-3(D) and FIGS. 4(A)-3(D), substantially no bright portions (white portions) were observed. This indicates that when the La content is not larger than the Ca content in the formulated starting material powder, substantially no third phase having a higher atomic ratio of La than in the main phase is formed.

The volume ratio of the third phase in an observed field, which was determined as in Example 1, was 0% or less than 0.5% both in FIGS. 3(A)-(D) and FIGS. 4(A)-(D).

Example 2

Figure 5:
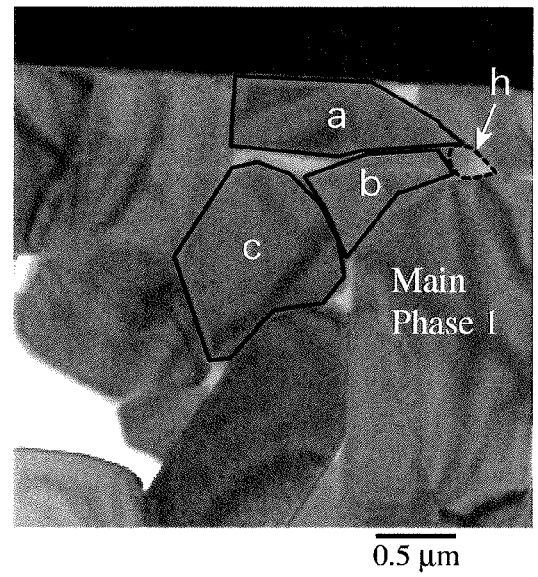
FIG. 5 is a photograph showing the structure of the sintered ferrite magnet of Example 2 observed by FE-TEM.
Figure 6:
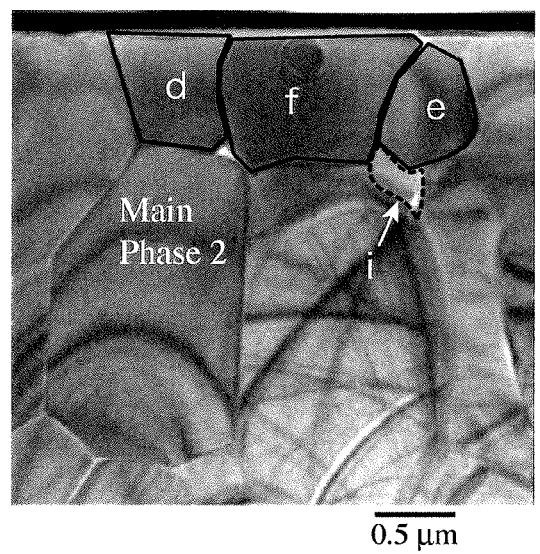
FIG. 6 is another photograph showing the structure of the sintered ferrite magnet of Example 2 observed by FE-TEM.
Figure 7:
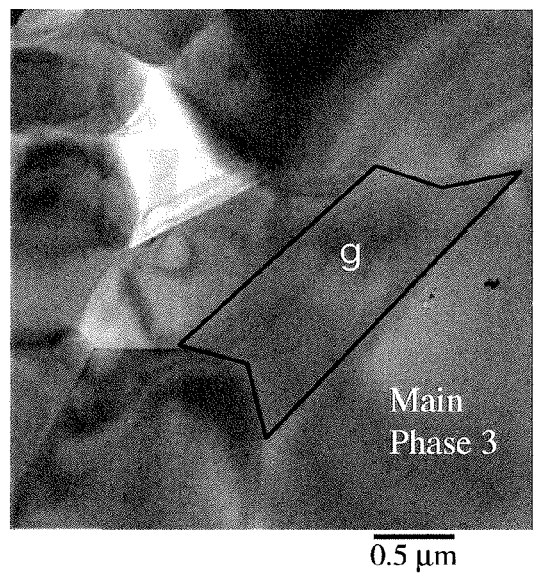
FIG. 7 is a further photograph showing the structure of the sintered ferrite magnet of Example 2 observed by FE-TEM.

In the vicinity of the third phase having a higher atomic ratio of La than in the main phase, which was obtained by composition contrast in a backscattered electron image in Example 1, a surface was cut away by focused ion beam (FIB) to conduct structure observation by a field emission transmission electron microscope (FE-TEM), and composition analysis by energy dispersive x-ray spectrometry (EDS). The structure observation results are shown in FIGS. 5-7, and the composition analysis results are shown in Table 2. All numbers in Table 2 are shown by an atomic ratio (%).

Portions shown by a, b, c and h in FIG. 5, portions shown by d, e, f and in FIG. 6, and portions shown by g in FIG. 7 are third phases. Also, main phases are shown as a main phase 1 in FIG. 5, a main phase 2 in FIG. 6, and a main phase 3 in FIG. 7. In α, β and γ in Table 2, grain boundary phases (particularly triple points in grain boundaries) in different fields from those of FIGS. 5-7 were subject to structure observation by FE-TEM and composition analysis by EDS.

TABLE 2

| Portions | Ca | Si | La | Co | Fe | Phase |
|---|---|---|---|---|---|---|
| a | 24.7 | 30.1 | 37.1 | 1.0 | 7.2 | Third Phase |
| b | 22.9 | 30.1 | 40.5 | 0.3 | 6.2 | Third Phase |
| c | 24.0 | 21.1 | 45.8 | 0.0 | 9.1 | Third Phase |
| d | 21.8 | 37.3 | 34.3 | 0.0 | 6.6 | Third Phase |
| e | 24.5 | 34.3 | 35.0 | 0.0 | 6.2 | Third Phase |
| f | 24.7 | 34.7 | 35.6 | 0.1 | 4.9 | Third Phase |
| g | 24.7 | 29.6 | 33.8 | 1.0 | 10.9 | Third Phase |
| h | 41.9 | 39.3 | 8.6 | 0.3 | 9.9 | Third Phase |
| i | 40.6 | 40.2 | 13.0 | 0.1 | 6.1 | Third Phase |
| 1 | 2.5 | 0.9 | 3.0 | 3.2 | 90.4 | Main Phase |
| 2 | 2.3 | 0.0 | 4.4 | 3.1 | 90.2 | Main Phase |
| 3 | 2.9 | 0.0 | 4.4 | 3.2 | 89.5 | Main Phase |
| α | 58.6 | 32.5 | 0.2 | 0.1 | 8.6 | Grain Boundary Phase |
| β | 66.3 | 31.0 | 0.6 | 0.0 | 2.1 | Grain Boundary Phase |
| γ | 64.3 | 32.7 | 0.8 | 0.1 | 2.1 | Grain Boundary Phase |

As is clear from 1 to 3 in Table 2, the main phases 1-3 in FIGS. 5-7 contained Ca, La, Co and Fe, particularly Co and Fe in larger amounts than in other portions. Namely, the main phase was Ca—La—Co ferrite.

As is clear from a to i in Table 2, the third phases indicated by a to i in FIGS. 5-7 contained Ca, Si, La and Fe, particularly with higher atomic ratios of La than in said main phases. Namely, the third phase indispensably contained La, with a higher atomic ratio of La than in the main phase.

It is clear from a to i in Table 2 that the third phases shown by a to i in FIGS. 5-7 are third phases (a to g) having relatively high atomic ratios of La, and third phases (h and i) having relatively low atomic ratios of La. The third phases having relatively high atomic ratios of La contained 21-25 atomic % of Ca, 21-38 atomic % of Si, 33-46 atomic % of La, and 4-11 atomic % of Fe. The third phases having relatively low atomic ratios of La contained 40-42 atomic % of Ca, 39-41 atomic % of Si, 8-13 atomic % of La, and 6-10 atomic % of Fe.

As described above, all portions shown by a to i surely contained Ca, Si, La and Fe despite slight differences in their proportions, with higher atomic ratios of La than in said main phase. They are defined as the third phases in the sintered ferrite magnet of the present invention. As described above, said third phase, which contains a phase having a relatively high atomic ratio of La and a phase having a relatively low atomic ratio of La, has a composition comprising 8-50 atomic % of La, 20-45 atomic % of Ca, 20-45 atomic % of Si, and 4-20 atomic % of Fe.

A small amount of Co contained in some of a to i in Table 2 may be considered as errors, because peaks of Fe—Kβ and Co—Kα are unseparably overlapping in EDS analysis. Accordingly, when the Co content is less than 1 atomic %, it may be considered that substantially no Co is contained. It cannot precisely be decided whether or not Co is contained in the third phase, but even if Co were contained, it would have substantially no influence on the atomic ratios of Ca, Si, La and Fe because Co is in a trace amount.

As shown by α to γ in Table 2, the compositions of grain boundary phases determined by structure observation by FE-TEM and composition analysis by EDS in different fields (particularly triple points in grain boundaries) from those of FIGS. 5-7 comprised 58-67 atomic % of Ca, 31-33 atomic % of Si, 1 atomic % or less of La, and 2-9 atomic % of Fe, with lower atomic ratios of La than in said main phases. Namely, the grain boundary phase in the present invention indispensably contains Si and Ca with a lower atomic ratio of La than in said main phase.

As described above, the sintered ferrite magnet of the present invention has a main phase composed of Ca—La—Co ferrite (ferrite having a hexagonal, M-type magnetoplumbite structure phase), a grain boundary phase containing Si and Ca with a lower atomic ratio of La than in said main phase, and a third phase containing La at a higher atomic ratio than in said main phase.

Example 3

Sintered magnets were produced in the same manner as in Example 1, except for formulating $CaCO_3$ powder, $La(OH)_3$ powder, $Fe_2O_3$ powder and $Co_3O_4$ powder to have compositions of $Ca_{1-x-y}La_xSr_{y'}Ba_{y''}Fe_{2n-z}Co_zO_8$ ($\delta \geq 0$), wherein 1−x−y, x, y', y", z and n are shown in Table 3, and except for changing the amounts of $SiO_2$ and $CaCO_3$ added at the time of pulverization and sintering temperatures as shown in Table 3. The existence of third phases was measured by composition contrast in backscattered electron image as in Example 1, and evaluated by the following standards:

Yes The third phase was 0.5-5% by volume, and

No The third phase was less than 0.5% by volume.

The magnetic properties of the resultant sintered magnets are shown in Table 3. In $H_k/H_{cJ}$, $H_k$ is the value of H at a position where J is $0.95B_r$ in a J (magnetization)–H (intensity of magnetic field) curve in the second quadrant.

TABLE 3

| Sample No. | 1 − x − y (Ca) | x (La) | y' (Sr) | y" (Ba) | z (Co) | n |
|---|---|---|---|---|---|---|
| 1 | 0.45 | 0.55 | — | — | 0.30 | 5.2 |
| 2 | 0.45 | 0.55 | — | — | 0.30 | 5.2 |
| 3 | 0.45 | 0.55 | — | — | 0.30 | 5.2 |
| 4 | 0.45 | 0.55 | — | — | 0.30 | 5.2 |
| 5 | 0.45 | 0.55 | — | — | 0.30 | 5.2 |
| 6 | 0.45 | 0.55 | — | — | 0.30 | 5.2 |
| 7 | 0.45 | 0.55 | — | — | 0.25 | 5.0 |
| 8 | 0.40 | 0.55 | — | 0.05 | 0.30 | 5.3 |
| 9 | 0.40 | 0.55 | 0.05 | — | 0.30 | 5.3 |
| 10 | 0.50 | 0.50 | — | — | 0.30 | 5.2 |
| 11 | 0.50 | 0.50 | — | — | 0.30 | 5.2 |
| 12 | 0.50 | 0.50 | — | — | 0.30 | 5.2 |
| 13 | 0.50 | 0.50 | — | — | 0.30 | 5.2 |
| 14 | 0.50 | 0.50 | — | — | 0.30 | 5.2 |
| 15 | 0.50 | 0.50 | — | — | 0.30 | 5.2 |
| 16 | 0.50 | 0.50 | — | — | 0.25 | 5.0 |
| 17 | 0.50 | 0.50 | — | — | 0.30 | 5.2 |

| Sample No. | CaO (% by mass) | $SiO_2$ (% by mass) | Sintering Temperature (° C.) | Third Phase | Magnetic Properties | | |
|---|---|---|---|---|---|---|---|
| | | | | | $B_r$ (T) | $H_{cJ}$ (kA/m) | $H_k/H_{cJ}$ (%) |
| 1 | 1.0 | 1.2 | 1190 | Yes | 0.408 | 295 | 73.2 |
| 2 | 1.5 | 1.2 | 1210 | Yes | 0.448 | 455 | 89.3 |
| 3 | 1.5 | 1.9 | 1190 | Yes | 0.356 | 315 | 57.4 |
| 4 | 2.0 | 1.2 | 1190 | Yes | 0.444 | 364 | 89.5 |
| 5 | 2.0 | 1.5 | 1210 | Yes | 0.439 | 475 | 85.3 |
| 6 | 2.0 | 1.8 | 1210 | Yes | 0.413 | 305 | 68.0 |
| 7 | 1.5 | 1.2 | 1200 | Yes | 0.444 | 365 | 96.0 |
| 8 | 1.5 | 1.2 | 1200 | Yes | 0.448 | 450 | 85.3 |
| 9 | 1.5 | 1.2 | 1200 | Yes | 0.448 | 455 | 85.2 |
| 10 | 1.0 | 1.2 | 1190 | No | 0.396 | 305 | 68.5 |
| 11 | 1.5 | 1.2 | 1210 | No | 0.443 | 476 | 81.6 |
| 12 | 1.5 | 1.9 | 1190 | No | 0.347 | 334 | 54.1 |
| 13 | 2.0 | 1.2 | 1190 | No | 0.443 | 366 | 84.5 |
| 14 | 2.0 | 1.5 | 1210 | No | 0.435 | 479 | 75.3 |
| 15 | 2.0 | 1.8 | 1210 | No | 0.389 | 318 | 55.9 |
| 16 | 1.5 | 1.2 | 1200 | No | 0.436 | 297 | 94.3 |
| 17 | 0.7 | 0.6 | 1210 | No | 0.458 | 351 | 84.3 |

It is clear from Table 3 that for example, the sintered ferrite magnet of Sample 11 comprising 1.5% by mass of CaO, and 1.2% by mass of $SiO_2$, in which the amount of $SiO_2$ added was more than 1% by mass, and the amount of CaO added was 1% or more by mass, had remarkably improved $H_{cJ}$ (from 351 kA/m to 476 kA/m), as compared with the sintered ferrite magnet of Sample 17 comprising 0.7% by mass of CaO, and 0.6% by mass of $SiO_2$, which corresponded to a conventional sintered Ca—La—Co ferrite magnet with relatively small amounts of CaO and $SiO_2$ added. However, the sintered ferrite magnet of Sample 11 had slightly decreased $B_r$, and $H_k/H_{cJ}$ decreased from 84.3% to 81.6%.

In the above sintered ferrite magnet of Sample 11 with remarkably improved $H_{cJ}$, 1−x−y=x (Ca=La), and the third phase was 0.5% or less by volume. The sintered ferrite magnet of Sample 2, which had the same amounts of CaO and $SiO_2$ added as those of the sintered ferrite magnet of Sample 11 but met the condition of 1−x−y<x (Ca<La), contained 0.5-5% by volume of the third phase, and had improved $B_r$ and $H_k/H_{cJ}$ despite slightly lower $H_{cJ}$ than that of the sintered ferrite magnet of Sample 11. Particularly, its $H_k/H_{cJ}$ was drastically improved than that of the sintered Ca—La—Co ferrite magnet of Sample 11 (from 81.6% to 89.3%).

Thus, as compared with the sintered ferrite magnet of Sample 17 corresponding to a conventional sintered Ca—La—Co ferrite magnet with small amounts of CaO and $SiO_2$ added, the sintered ferrite magnet of Sample 2 within the scope of the present invention with more than 1% by mass of $SiO_2$ and 1% or more by mass of CaO added and containing the third phase had improved $H_{cJ}$ (455 kA/m, compared with 351 kA/m) and $H_k/H_{cJ}$ (89.3%, compared with 84.3%) with high $B_r$ maintained (0.448 T, compared with 0.458 T).

It is clear from Table 3 that the sintered ferrite magnets of Samples 8 and 9 respectively containing Ba and Sr as the element A also had good magnetic properties, like the sintered ferrite magnet of Sample 7 containing no element A.

It is thus clear that by two effects: the improvement of $H_k/H_{cJ}$ by the third phase, and the improvement of $H_{cJ}$ by the addition of large amounts of $SiO_2$ and $CaCO_3$, the sintered ferrite magnets of the present invention have high $H_{cJ}$ and $H_k/H_{cJ}$ with conventionally unachievably high $B_r$ maintained.

Effect of the Invention

The present invention provides sintered ferrite magnets, which are not demagnetized by thinning because of remarkably improved $H_{cJ}$ and $H_k/H_{cJ}$ with high $B_r$ maintained.

The use of the sintered ferrite magnets of the present invention provides small, lightweight, high-performance electric parts for automobiles and electric appliances such as motors, generators, speakers, etc.

What is claimed is:

1. A method for producing a sintered ferrite magnet comprising Ca, La, an element A (Ba and/or Sr), Fe and Co, and having a main phase composed of ferrite having a hexagonal, M-type magnetoplumbite structure, a grain boundary phase containing Si and Ca with a lower atomic ratio of La than in said main phase, and a third phase containing La, Ca, Si and Fe in such proportions that La is 8-50 atomic %, Ca is 20-45 atomic %, Si is 20-45 atomic %, and Fe is 4-20 atomic %, based on the total amount (100 atomic %) of those elements, wherein the third phase contains La at a higher atomic ratio than in said main phase, said method comprising a step of preparing a starting material powder having a metal element composition (by atomic ratio) represented by the general formula of $Ca_{1-x-y}La_xA_yFe_{2n-z}Co_z$, wherein 1−x−y, x, y and z, and n representing a molar ratio meet $0.3 \leq 1-x-y < 0.65,$ $0.3 < x \leq 0.65,$ $1-x-y < x,$ $0 \leq y \leq 0.2,$ $0.25 \leq z \leq 0.65,$ and $4.5 \leq n \leq 7,$ a step of calcining said starting material powder to obtain a calcined body;

a step of pulverizing said calcined body to powder;

a step of molding said powder to obtain a green body; and a step of sintering said green body to obtain a sintered body;

more than 1% and 1.8% or less by mass of $SiO_2$ and 1-2% by mass (calculated as CaO) of $CaCO_3$ being added to 100% by mass of said calcined body before the pulverization step.

2. The method for producing a sintered ferrite magnet according to claim 1, wherein the amount of said $SiO_2$ added is 1.1-1.6% by mass.

3. The method for producing a sintered ferrite magnet according to claim 1, wherein the amount of said $CaCO_3$ added is 1.2-2% by mass (calculated as CaO).

* * * * *